Figure 1:
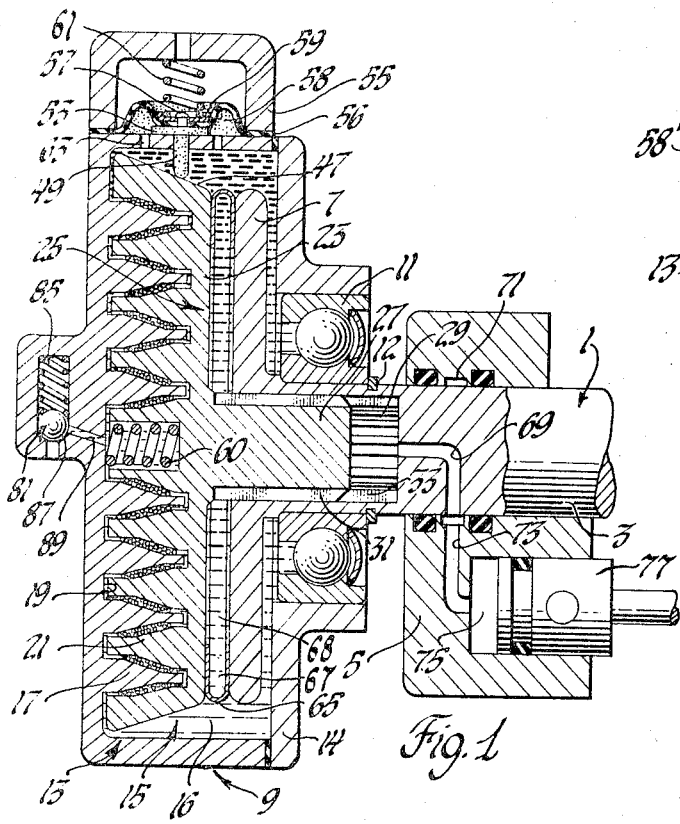

May 16, 1967 D. G. KOKOCHAK ETAL 3,319,754

CLUTCH

Filed Jan. 8, 1965

INVENTORS
David G. Kokochak, &
BY James J. Gumbleton a. m. Heiter
ATTORNEY

United States Patent Office 3,319,754
Patented May 16, 1967

3,319,754
CLUTCH
David G. Kokochak, Royal Oak, and James J. Gumbleton, Troy, Mich., assignors to General Motors Corporation, Detroit, Mich., a corporation of Delaware
Filed Jan. 8, 1965, Ser. No. 424,355
8 Claims. (Cl. 192—57)

This invention relates in general to clutches and more particularly to a combination hydraulic and mechanical clutch.

Prior art clutches generally include drive and driven members which can be operatively connected for application of power to a load or disconnected to enable the power source to operate without load application. Such clutches have primarily depended upon mechanical, hydraulic, or a combination hydraulic and mechanical means to operatively connect the drive and driven members. Prior art clutches which primarily depended upon a mechanical connection have been generally satisfactory but usually require a complex operating system for smooth engagement of the driving and driven members. Hydraulic clutches which adequately provide for smooth initial drives usually do not have the torque capacity of an equivalent mechanical clutch. Combination hydraulic and mechanical clutches have heretofore required relatively complex operator mechanism for clutch engagement. Furthermore, the mechanical connection in these latter clutches is sometimes premature resulting in an undesirable, sudden increase in rotational speed of the driven member.

The present invention utilizes hydraulic and mechanical means to connect the drive and driven members with fluid shear providing smooth initial clutch operation, and mechanical friction providing for smooth direct mechanical engagement and high torque capacity. This invention also advantageously uses this hydraulic and mechanical means for clutch disengagement.

It is an object of this invention to provide a new and improved combination hydraulic and mechanical clutch which features a smooth initial fluid operation and a smooth direct subsequent mechanical operation for high-capacity torque transmission.

Another object of this invention is to provide a clutch having fluid means to connect the drive and driven members in one condition of clutch operation, mechanical means to smoothly connect the drive and driven members in a second condition of clutch operation, and with the fluid means providing for clutch disengagement in another condition of clutch operation.

Another object of this invention is to provide a new and improved torque-transmitting unit, having relatively rotatable and axially movable members with a working fluid and a plurality of mechanical elements disposed therebetween, which in one phase of operation functions as a fluid torque transmitting unit and in another phase of operation as a high capacity, mechanical torque transmitting unit.

Another object of this invention is to provide a rotatable drive member which can rotate a driven member by fluid means located between the two members and subsequently by separable mechanical means which are between the two members.

Another object of this invention is to provide a clutch having, a first rotatable member, a second rotatable member housing a viscous fluid therein and the first rotatable member, operator means for moving the one of the members toward the other, ball means located between the two members for effecting a smooth mechanical coupling of the two members on the positioning of the two members at a predetermined distance from each other and with the viscous fluid and ball means providing for disengagement of the two members under predetermined conditions.

Figure 2:
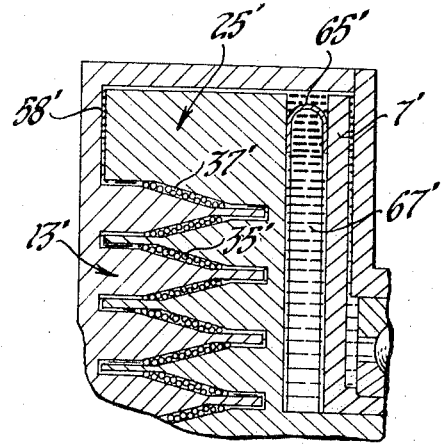
Figure 3:
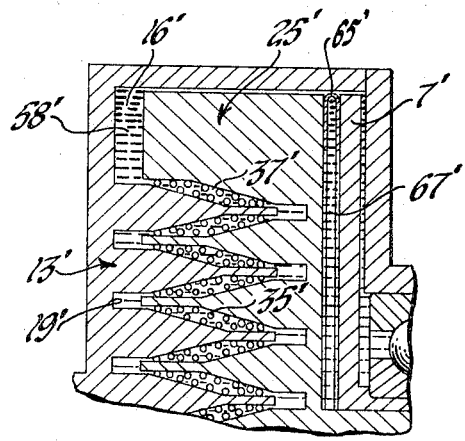
Figure 4:
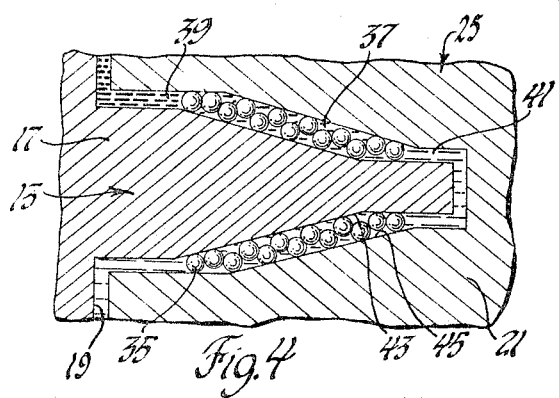
Figure 5:
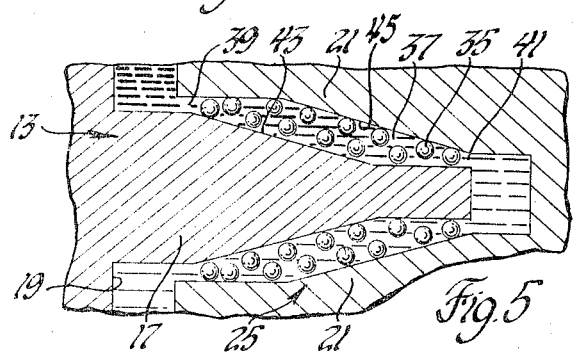

These and other objects of this invention will be apparent from the following description and claims taken in combination with the following drawings, in which:

FIGURE 1 is a side sectional view of one embodiment of our invention,

FIGURES 2 and 3 are side sectional views of another embodiment of the invention showing the invention in its fully engaged and disengaged positions, FIGURE 4 is an enlarged view of a portion of the invention embodiments showing the drive and driven members in mechanical engagement, and FIGURE 5 shows the drive and driven members of the invention embodiments completely disengaged with no torque being transmitted by either hydraulic or mechanical means.

FIGURE 1, the first illustrated embodiment of the present invention, has a rotatable input drive member 1 operated by any suitable power source. This input member is fixed from longitudinal movement in a power train and includes an elongated shaft portion 3 rotatably mounted in a support 5. The input member has an enlarged circular head portion 7 fixed to the end of the shaft portion. As shown, this head portion is mounted in a rotatable driven member or housing 9 by an annular, sealed ball bearing unit 11 retained thereon by snap ring 12. The housing, which is also fixed from longitudinal movement, includes a hollow body member 13 and cover 14 which closes the body member to provide a chamber 15 for a viscous working fluid 16.

The body member 13 has a series of tapered concentric rings or annuli 17 integrally formed on an internal face 19 thereof. These annuli provide grooves therebetween which are capable of receiving complementing annuli 21 formed on one face of an enlarged head portion 23 of the wedging plate 25. This plate also includes a splined shaft 27 which extends from the opposite face of the head portion and which projects into a cavity 29 formed in the end of shaft 3. These two shafts are joined by meshing splines 31 and 33 which enable the input member 1 to rotate the wedging plate and which permit the wedging plate to be moved longitudinally in housing 9 and with respect to shaft 3.

As illustrated in FIGS. 1 and 4, the spherical balls 35 prevent direct contact of the internal friction faces 19 of body 13 and plate 25. When assembled these balls are captured in the shear spaces 37 between the annuli of the body member and the drive plate. The clearances 39 and 41, shown in FIGS. 2 and 3, are less than the diameter of the balls, thus preventing the movement of the balls from the spaces 37 during operation of the invention. The annuli 17 and 21 have inclined outer faces 43 and 45. As will be apparent from FIGS. 4 and 5, movement of the plate 25 from the position of FIG. 5 to that of FIG. 4 will reduce the volume of spaces 37 to gradually confine the balls and eventually cause them to jam to prevent further movement of the wedging plate toward the face 19 and to mechanically connect the housing 9 to plate 25.

In the embodiment of FIG. 1, the outer surface of the drive wedging plate is formed with a conical exterior surface 47 which actuates push rod 49. This push rod extends through an opening formed in the peripheral wall of the housing 9 and includes a head 53. A vented reservoir housing 55, in which the push rod is reciprocally mounted, is secured to the outer part of the housing 9 by suitable fastener means which are not shown. Resilient diaphragm 56 fastened to the head 53 by fastener 57 is positioned between the housing 9 and the housing 55. As shown, a cup-shaped seat 59 is secured to the head 53 by fastener 57. Coil spring 61, having one end positioned on this seat and having the other end in contact with the upper inner portion of the housing 55, forces the head 53 and diaphragm 56 toward the outer periphery of the housing 9 to force viscous fluid 16 through orifices 63 into chamber 15. Spring 61 has strength sufficient to prevent outward movement of push rod 49 and associated parts by centrifugal force when housing 9 is rotated. Although only a single reservoir housing and push rod have been shown, other similar housings and push rods are equally disposed around housing 9 for a similar purpose. It will be seen from FIG. 1 that longitudinal movement of the wedging plate 25 away from the driven member 13 will force the rod 49 to ride on the tapered outer surface 47 of the wedging plate. This action moves the head 53 and diaphragm 56 outwardly and further into the housing 55 creating a reservoir 58 available for fluid storage.

As shown in FIG. 1, a circular resilient diaphragm member 65 generally U-shaped in cross section has opposed sides which are secured to head portions 7 and 23, respectively, to provide an inner expansible and contractible chamber 67, containing fluid 68, in the housing 9. It will be understood that this chamber hydraulically communicates at all times with the cavity 29 through the spline connection between shaft portion 27 and shaft 3 or through other suitable channels otherwise formed in the shaft portion. A passage 69, formed in the shaft 3, leads from cavity 29 to an annular groove 71 formed in support 5. A passage 73 in this support hydraulically connects this groove to a piston chamber 75. Piston 77, actuated by suitable control means not shown, is reciprocally mounted in chamber 75.

A centrifugal ball check valve 81 provided in body members 13 includes a spring 85 and cooperating ball 87 which allows air to enter through passage 89 to the void left when fluid 16 moves out of the space between rings 17 and 21 and enters the reservoir beneath the diaphragm 56, as will appear below. When the housing 9 is not rotating, the spring biases the ball to close the passage 89 to prevent escape of oil therethrough.

FIGURE 5 shows the drive wedging plate and the driven member in disengagement. In this situation the continuously rotating drive wedging plate is located at a predetermined distance from the face 19 of body member 13, the balls are not in driving engagement between the two members and substantially all of the fluid 16 is in the reservoir 58 beneath the diaphragm 56 due to centrifugal force. It will be understood that the push rod has been extended by the inclined surface of the drive wedging plate. If it is then desired to drive the output member, the piston is actuated by moving it inwardly to move some of the fluid 68 in chamber 75 and cavity 29 into the chamber 67 between the head portion 7 and the drive wedging plate. This expands chamber 67; the hydraulic pressure in this chamber and on the end of shaft portion 27 forces the drive wedging plate toward the driven member 13. The push rod will then ride downwardly on the inclined surface 47 of the drive wedging plate and the action of the coil spring on the diaphragm 56 will force the fluid out of the reservoir 58 into the chamber 15 of housing 9 in proportion to movement of plate 25. When sufficient fluid has been expelled from the reservoir it will fill the shear space between the concentric annuli of the drive wedging plate and the driven member. Since the input shaft 3 and the drive wedging plate are rotating, the viscous fluid 16 between the annuli will be sheared and the driven member will begin to rotate with slippage due to the shear of the hydraulic fluid 16. In this condition of operation, the unit functions as a hydraulic clutch providing smooth torque transmittal.

As the piston is moved further into its chamber the wedging plate will be moved further toward face 19 and the balls will be forced inwardly on the inclined surfaces of annuli 17 and 21 into contact with each other with some initial slippage. Rolling action of the balls in this phase of operation provides for a smooth, mechanical connection of the wedging plate and the housing and increases the torque capacity of the unit. Slight additional movement of the wedging plate toward the face 19 will jam the balls, locking the body 13 and plate 25 together for transmittal of a high torque with no slippage.

When it is desired to disengage the two members, the piston is then moved in a direction out of the chamber to depressurize chamber 67. The centrifugal force developed in the rotating fluid and by balls 35 between the wedging plate and the inner face of body member 13 will force the wedging plate away from the driven member and into a position in which the balls do not provide a mechanical connection between the two members. Helper spring 60 may be used to assist in moving the wedging plate out of engagement if desired. During this time the push rod has been forced outwardly by the rearwardly moving wedging plate and practically all of the viscous fluid will be forced into the reservoir formed beneath diaphragm 56. The centrifugally-operated ball check during this time will be forced outwardly to allow air to enter in the shear zone between the opposing annuli to take the place of viscous fluid centrifugally displaced therefrom. Once the fluid has been removed from this zone there will, of course, be no torque transmittal and the rotation of housing 9 will diminish and finally stop. If the input member is then stopped from rotation, the viscous fluid will seek a level in housing 9. It will be understood that housing 9 could, if desired, be the input drive member while wedge plate 25 and member 1 connected thereto could be the output driven member.

The embodiment of the clutch of FIGS. 2 and 3 is similar to that of FIG. 1. However, this embodiment does not require the push rod, diaphragm and external reservoir housing of the first embodiment, as will appear below. The same reference numerals are used to identify the same or similar parts of the two embodiments but with the numerals being primed in FIGS. 2 and 3.

As shown in FIGURE 3, the clutch is disengaged when the clutch face of the wedging plate 25' and the inner face 19' of the body member 13' are at a maximum distance from each other and viscous fluid 16' is in the internal reservoir 58'. However, as the rotating wedge plate is moved toward the face 19' of the housing body member by expansion of chamber 67', as described in connection with FIG. 1, the volume of the reservoir is reduced and the viscous fluid 16' is forced between the plate 25' and the inner face 19' increasing the shear area of the fluid and torque capacity of the clutch. When the shear spaces 37' between the face 25' and face 19' are completely filled with the fluid 16' the torque capacity of the clutch is increased. Upon further movement of the drive plate toward the face of the driven plate, the balls will become progressively confined in the spaces 37' and begin to transmit torque mechanically, further increasing clutch torque capacity as in the FIG. 1 embodiment. In this phase of operation the balls permit some relative rotation between the drive and driven plates for smooth load pick-up if required. Finally, upon further movement of the drive plate toward the driven plate the balls will pack to securely couple the drive and driven plate together for maximum torque capacity.

When the fluid pressure in chamber 67' is relieved, the plate 25' is displaced to the right in FIGS. 2 and 3 by fluid pressure between the wedge plate 25' and the body member 13' and the centrifugal force developed by the balls 35'. Chamber 67' contracts and the volume of the internal reservoir increases allowing the viscous fluid between the wedge plate 25' and body 13' to move back into the reservoir 58'.

Although in its preferred form, balls have been used to mechanically connect the drive and driven members, other friction means may be substituted therefor for the same purpose. It will be understood that other modifications and structures such as brakes made in accordance with this invention can be constructed. With this in mind, it will be understood that this invention is limited not by the above description but only by the scope of the appended claims.

We claim:

1. In a torque-transmitting device, the combination of spaced rotatable driving and driven members, said driven member forming a chamber for said drive member, said driven member having an internal face portion, said driving member having a face portion opposing said internal face portion, said face portions defining a space therebetween, said driving member being shiftable in said chamber between a disengaged position in which said members are completely disengaged to a position in which said members are fully engaged, a viscous fluid means for hydraulically connecting said members in intermediate driving member positions, a reservoir on said driven member for said fluid means, means for forcing said fluid from said reservoir into said chamber and the space between said face portions on movement of said driving member toward said fully engaged position, ball members retained between said face portion to mechanically connect said members on movement of said driving member to its fully engaged position, flexible means in the chamber of said driven member for shifting said driving means, and means for actuating said flexible member.

2. In a torque-transmitting device, the combination of spaced rotatable driving and driven members, said driven member forming a chamber housing for said drive member, said members having face portions in a face-to-face relationship and defining a space therebetween, said face portions having concentric projecting rings forming grooves therebetween, said rings of one of said members being adapted to be received into the grooves of the other of said members, said driving member being shiftable in said chamber between a disengaged position in which said members are completely disengaged to a position in which said members are fully engaged, a viscous fluid means for hydraulically connecting said members in intermediate driving member positions, a reservoir for said fluid means, means for forcing said fluid from said reservoir to the space between said face portions on movement of said driving member toward said fully engaged position, ball members retained between said rings of said members to mechanically connect said members on movement of said driving member to its fully engaged position, an expansible and contractible fluid chamber in the chamber of said driven member for shifting said driving means to said positions, and piston means movable in one direction for supplying fluid under pressure to said fluid chamber to expand said fluid chamber, said last-mentioned means being movable in an opposite direction to allow said chamber to be contracted by fluid pressure on the face portion of said driving member.

3. In combination, a rotatable input shaft having a head portion, a drive member, means connecting said drive member to said shaft for rotation therewith and for longitudinal movement thereon, a driven member rotatably mounted on said shaft, said driven member having a chamber for reception of said head portion and said drive member, flexible means connecting said head portion and said drive means for forming an expansible and contractible chamber therebetween, means for supplying fluid under pressure to said last-mentioned chamber for the expansion thereof, said drive and driven members having face portions which oppose each other, said face portions having concentric rings forming grooves therebetween, said rings projecting into said grooves, ball means positioned in said grooves for mechanically connecting said members on movement of said drive into a predetermined position with respect to said driven member, viscous fluid means for hydraulically coupling said driven member to said drive member for rotation thereby before said predetermined position is reached by said drive member, an external reservoir for said viscous fluid on said driven member, said reservoir including resilient means for expelling fluid therefrom into said grooves on movement of said drive member toward said driven member, and means on said driving member for controlling the expulsion of fluid from said reservoir.

4. In combination, a rotatable input shaft having a head portion, a drive member, means connecting said drive member to said shaft for rotation therewith and for longitudinal movement thereon, a driven member rotatably mounted on said shaft, said driven member having a chamber for reception of said head portion and said drive member, flexible means connecting said head portion and said drive means for forming an expansible and contractible chamber therebetween, means for supplying fluid under pressure to said last-mentioned chamber for the expansion thereof, said drive and driven members having face portions which oppose each other, said face portions having concentric rings forming grooves therebetween, said rings projecting into said grooves, ball means positioned in said grooves for mechanically connecting said members on movement of said drive member into a predetermined position with respect to said driven member, viscous fluid means for hydraulically coupling said driven member to said drive member for rotation thereby before said predetermined position is reached by said drive member, said fluid being contained entirely within said chamber of said driven member, and said expanding chamber providing means for forcing fluid into said grooves on movement of said driving member toward said driven member.

5. In a torque-transmitting device, a first rotatable member having an inner face formed with projecting annuli, a second rotatable member having an outer face formed with projecting annuli, said second rotatable member being mounted for longitudinal movement in said first member with respect to said inner face, said annuli of one of said members being adapted to be received between the annuli of the other of said members, said first member including an internal fluid reservoir, a viscous fluid in said reservoir, an expansible and contractable chamber means for moving said second member toward said inner face to progressively decrease the volume of said reservoir, said viscous fluid being forced between the annuli of said members in response to movement of said second member toward said inner face to hydaulically connect said members for rotation of one member by the other, a plurality of ball means between said annuli of said member for mechanically connecting said members on movement of said second member a predetermined distance from said inner face, said fluid means and said ball means combining to move said second member from said inner face on contraction of said chamber.

6. In combination a first rotatable member having a friction surface, a second member having a friction surface spaced from the friction surface of said first member, a working fluid disposed between said friction surfaces, said fluid responding to rotation of said first member relative to said second member to apply a torque to said second member, means for moving one of said surfaces from a maximum to a minimum spacing with respect to the other of said members, a plurality of separable ball means disposed between the friction surfaces of said members, said ball means being operative in response to the intermediate spacing of said friction surfaces from each other to permit relative slippage between said members while transmitting torque from said first member to said second member, said ball means being closely confined to a limited area between said friction surfaces in response to the minimum spacing of said surfaces from each other to mechanically connect said members for maximum torque capacity.

7. In a torque transmitting device, rotatable drive and driven members, said members having friction surfaces facing each other, said drive member acting through torque transmitting fluid disposed between said members to apply a torque to said driven member in response to relative rotation of said members, means for axially moving one of said members toward the other of said members, a plurality of ball means disposed between said drive and driven members, said friction surfaces having retaining means to retain said ball means between said surfaces, said ball means being initially operative in response to the axial movement of one of said members to mechanically connect said members while permitting limited relative rotation therebetween, said ball means being substantially operative in response to further axial movement of one of said members toward the other of said members to mechanically couple said members and condition said device for maximum torque capacity.

8. In a torque transmitting device for driving a load, the combination of drive and driven members, each having a facing friction surface, a working fluid disposed between said members, means for axially moving one of said members toward the other of said members, a plurality of separable ball units confined between the friction faces of said members, said units being initially operative in response to movement of one of said members toward the other of said members to mechanically connect said members while allowing relative rotation between said members for gradual load pickup, said ball units being closely confined upon further movement of one of said members toward the other of said members to couple said members together for rotation as a unit to increase the torque transmitting capacity of said device.

References Cited by the Examiner

UNITED STATES PATENTS

| | | | |
|---|---|---|---|
| 2,627,954 | 2/1953 | Lewis | 192—57 X |
| 2,768,722 | 10/1956 | Muller | 192—3.2 |
| 2,845,157 | 7/1958 | Gambell | 192—21.5 |
| 3,101,825 | 8/1963 | Caroli et al. | 192—58 X |

DAVID J. WILLIAMOWSKY, *Primary Examiner.*

A. T. McKEON, *Assistant Examiner.*